(12) United States Patent
Park et al.

(10) Patent No.: US 12,214,661 B2
(45) Date of Patent: Feb. 4, 2025

(54) QUESTION-AND-ANSWER SYSTEM AND METHOD OF CONTROLLING THE SAME

(71) Applicants: Hyundai Motor Company, Seoul (KR); Kia Corporation, Seoul (KR)

(72) Inventors: Cheoneum Park, Gyeonggi-do (KR); Mirye Lee, Seoul (KR); Donghyeon Kim, Seoul (KR); Cheongjae Lee, Gyeonggi-do (KR); Sung Wook Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 432 days.

(21) Appl. No.: 17/673,287

(22) Filed: Feb. 16, 2022

(65) Prior Publication Data

US 2022/0258607 A1 Aug. 18, 2022

(30) Foreign Application Priority Data

Feb. 18, 2021 (KR) .................. 10-2021-0021874

(51) Int. Cl.
*B60K 35/00* (2024.01)
*B60K 35/10* (2024.01)
*B60K 35/28* (2024.01)
*G06N 3/04* (2023.01)
*G06N 5/04* (2023.01)

(52) U.S. Cl.
CPC ............ *B60K 35/00* (2013.01); *G06N 3/04* (2013.01); *G06N 5/04* (2013.01); *B60K 35/10* (2024.01); *B60K 35/28* (2024.01); *B60K 2360/148* (2024.01); *B60K 2360/161* (2024.01)

(58) Field of Classification Search
CPC ........ B60K 35/00; B60K 35/10; B60K 35/28; B60K 2360/148; B60K 2360/161; G06N 3/04; G06N 5/04; G06N 3/044; G06N 3/045; G06N 3/047; G06N 3/08; G06F 16/3344; G06F 16/3329; G06F 16/35;
(Continued)

(56) References Cited

U.S. PATENT DOCUMENTS 11,836,638 B2 * 12/2023 Agarwal ............. G06F 18/2415
2018/0054464 A1 * 2/2018 Zhang ..................... H04L 51/02
(Continued)

*Primary Examiner* — Daniel C Washburn
*Assistant Examiner* — Athar N Pasha

(57) ABSTRACT

A question-and-answer system providing an appropriate answer for a vehicle-related FAQ by using deep learning, and corresponding method are provided. The question-and-answer system includes: a memory that stores a plurality of representative questions to match a plurality of answers corresponding to the plurality of representative questions, respectively; a learning module configured to output a representative question corresponding to an input sentence from among the stored plurality of representative questions; and an output module configured to search the memory or an answer that matches the output representative question and output the found answer. The learning module is configured to perform multi task learning using a plurality of extended sentences for the plurality of representative questions as input data, and using the plurality of representative questions corresponding to the plurality of extended sentences, respectively, and a plurality of categories to which the plurality of extended sentences belong, respectively, as output data.

10 Claims, 18 Drawing Sheets

(58) Field of Classification Search
CPC .. G06F 18/241; G06F 18/2415; G06F 40/295; G06F 16/36; G06F 40/268; G10L 15/005
See application file for complete search history.

(56) References Cited

U.S. PATENT DOCUMENTS

| | | | |
|---|---|---|---|
| 2019/0087728 A1* | 3/2019 | Agarwal | G06N 3/047 |
| 2020/0097820 A1* | 3/2020 | Song | G06N 3/08 |
| 2020/0210776 A1* | 7/2020 | Xiong | G06N 5/041 |
| 2022/0254507 A1* | 8/2022 | Dai | G06F 40/30 |
| 2023/0069935 A1* | 3/2023 | Choi | G06F 16/3329 |

* cited by examiner

FIG. 2

| REPRESENTATIVE QUESTION | ANSWER |
|---|---|
| WHAT IS AUTO-HOLD? | AUTO HOLD IS FUNCTION THAT ALLOWS VEHICLE TO REMAIN STATIONARY EVEN IF YOU TAKE YOUR FOOT OFF BRAKE AFTER VEHICLE HAS STOPPED. |
| HOW DO I LOOSEN SEAT BELT? | PRESS BUCKLE ON RIGHT OR LEFT SIDE OF SEAT. |
| HOW DO I TURN ON HOT WIRE OF STEERING WHEEL? | PRESS STEERING WHEEL HOT WIRE BUTTON NEXT TO START BUTTON. |

FIG. 3

| REPRESENTATIVE QUESTION | EXTENDED SENTENCE |
|---|---|
| WHAT IS AUTO-HOLD? | WHAT IS FUNCTION THAT DOESN'T REQUIRE TO KEEP STEPPING ON BRAKE? <br> ⋮ |
| HOW DO I TURN ON HOT WIRE OF STEERING WHEEL? | I WANT TO TURN ON HAND HEATER. WHAT SHOULD I DO? <br> ⋮ |
| ⋮ | ⋮ |

FIG. 7

| | |
|---|---|
| INPUT SENTENCE | 안전벨트가 빠지지 않는데 어떻게 해야 하지? |
| INPUT SENTENCE NORMALIZATION | 안전벨트가 빠지지 않는데 어떻게 해야 하지 |
| MORPHEME ANALYSIS RESULT | 안전, 벨트, 가, 빠지, 지, 않, 는데, 어떻게, 하, 아야, 하, 지 |
| PART-OF-SPEECH ANALYSIS RESULT | NNG, NNG, JKS, VV, EC, VX, EC, MAG, VV, EC,VX, EF |
| SYLLABLE ANALYSIS RESULT | 안, 전, 벨, 트, 가, 빠, 지, 지, 않, 는, 데, 어, 떻, 게, 해, 야, 하, 지 |

FIG. 8

| INPUT SENTENCE TEXT | 안전/NNG, 벨트/NNG, 가/JKS, 빠지/VV, 지/EC, 않/VX, 는데/EC, 어떻게/MAG, 하/VV, 아야/EC 하/VX, 지/EF |
|---|---|
| INPUT SENTENCE INDEX | 480, 5614, 26, 852, 63, 73, 179, 1, 50, 141, 68, 3440 |
| SYLLABLE UNIT ANALYSIS RESULT | [안, 전], [벨, 트], [가], [빠, 지], [지], [않], [는, 데], [어, 떻, 게], [하], [아, 야], [하], [지] |
| SYLLABLE UNIT INDEX | [ [56, 6], [195, 113], [38], [271, 11], [11], [299], [24, 74], [17, 106, 75], [23], [10, 52], [23], [11] ] |

FIG. 13

| Model | Korean | | | | English | | | |
|---|---|---|---|---|---|---|---|---|
| | FAQ acc | Cat. acc | NER F1 | ms/sent | FAQ acc | Cat. acc | NER F1 | ms/sent |
| RNN (baseline) | 76.51 | 75.88 | 74.64 | 0.945 | 81.91 | 76.30 | 72.03 | 1.224 |
| Our model | 85.24 | 87.94 | 74.79 | 0.967 | 82.95 | 79.42 | 73.56 | 0.664 |

QUESTION-AND-ANSWER SYSTEM AND METHOD OF CONTROLLING THE SAME

CROSS-REFERENCE TO RELATED APPLICATION

This application claims under 35 U.S.C. § 119(a) the benefit of Korean Patent Application No. 10-2021-0021874, filed on Feb. 18, 2021 in the Korean Intellectual Property Office, the entire contents of which are incorporated herein by reference.

BACKGROUND

1. Technical Field

The disclosure relates to a question-and-answer system that provides an answer to a question uttered by a user and a method of controlling the same.

2. Description of the Related Art

A dialog system is a system that identifies an intention of a user through a dialogue with the user and provides a service corresponding to the identified intention of the user. In association with a specific device, the dialog system also performs control on the device according to an intention of a user, or provides specific information according to the intention of the user.

Because users inside vehicles have spatial and situational restriction on their movements, a dialogue system may be usefully used in a way that recognizes the intention of a user through an utterance of the user and provides a service desired by the user.

In particular, due to a great need for a service that provides an answer to a vehicle-related question of the user, there is a demand for research and development to improve the accuracy and quality of the service.

SUMMARY

Embodiments of the present disclosure provide a question-and-answer system capable of providing an appropriate answer to a vehicle-related Frequently Asked Question (FAQ) by applying deep learning, and a method of controlling the same.

Additional aspects of the disclosed embodiments will be set forth in part in the description which follows.

According to an embodiment of the disclosure, there is provided a question-and-answer system including: a memory in which a plurality of representative questions are stored to match a plurality of answers corresponding respectively to the plurality of representative questions; a learning module configured to output a representative question corresponding to an input sentence from among the stored plurality of representative questions; and an output module configured to search the memory or an answer that matches the output representative question and output the found answer. The learning module is configured to perform multi task learning by using a plurality of extended sentences for the plurality of representative questions as input data, and by using the plurality of representative questions corresponding respectively to the plurality of extended sentences, and a plurality of categories to which the plurality of extended sentences belong, respectively, as output data.

The learning module may be configured to perform the multi task learning by using the plurality of extended sentences as input data, and by using the plurality of representative questions, the plurality of categories, and a plurality of named entities included in the plurality of extended sentences, respectively, as output data.

The plurality of representative questions stored in the memory may include frequently asked questions (FAQs) related to a vehicle.

The plurality of named entities may include terms related to a vehicle.

The learning module may be configured to, in the multi-task learning, classify a representative question corresponding to the input data from among the stored plurality of representative questions and a category to which the input data belongs from among the plurality of categories.

The learning module may be configured to calculate a loss value of the classified representative question and a loss value of the classified category, and to adjust a weight of a deep learning model used for the multi-tasking learning based on the calculated loss values.

The learning module may be configured to, in the multi task learning, classify a representative question corresponding to the input data from among the stored plurality of representative questions, a category to which the input data belongs from among the plurality of categories, and a named entity included in the input data from among the plurality of named entities.

The learning module may be configured to calculate a loss value of the classified representative question, a loss value of the classified category, and a loss value of the classified named entity, and to adjust a weight of a deep learning model used for the multi-tasking learning based on the calculated loss values.

The learning module may include: an encoding module configured to encode an input sequence corresponding to the input data; a question classifier configured to classify the representative question based on output of the encoding module; and a category classifier configured to classify the category based on the output of the encoding module.

The encoding module may include: a first encoding layer configured to perform global encoding on the input sequence; and a second encoding layer configured to perform sequential encoding on output of the first encoding layer.

The learning module may further include a variational inference network that is configured to apply a variational inference on output of the encoding module. Output of the variational inference network may be input to the category classifier.

The learning module may include: an encoding module configured to encode an input sequence corresponding to the input data; a question classifier configured to classify the representative question based on output of the encoding module; a category classifier configured to classify the category based on the output of the encoding module; and a named entity classifier configured to classify the named entity based on the output of the encoding module.

According to an embodiment of the disclosure, a method of controlling a question-and-answer system is provided. The method includes: storing a plurality of representative questions to match a plurality of answers corresponding respectively to the plurality of representative questions; performing multi task learning by using a plurality of extended sentences for the plurality of representative questions as input data, and by using the plurality of representative questions corresponding respectively to the plurality of extended sentences, and a plurality of categories to which the plurality of extended sentences belong, respectively, as output data; in response to the multi task learning being completed, determining a representative question corresponding to an input sentence uttered by a user from among the stored plurality of representative questions based on a result of the multi-task learning; and determining an answer that matches the determined representative question from among the stored plurality of answers.

Performing the multi task learning may include performing the multi-task learning by using the plurality of extended sentences as input data, and by using the plurality of representative questions, the plurality of categories, and a plurality of named entities included in the plurality of extended sentences, respectively, as output data.

The stored plurality of representative questions may include frequently asked questions (FAQs) related to a vehicle.

The plurality of named entities may include terms related to a vehicle.

Performing the multi-task learning may include classifying a representative question corresponding to the input data from among the stored plurality of representative questions and a category to which the input data belongs from among the plurality of categories.

Performing the multi-task learning may include: calculating a loss value of the classified representative question and a loss value of the classified category; and adjusting a weight of a deep learning model used for the multi-tasking learning based on the calculated loss values.

Performing the multi task learning may include classifying a representative question corresponding to the input data from among the stored plurality of representative questions, a category to which the input data belongs from among the plurality of categories, and a named entity included in the input data from among the plurality of named entities.

Performing the multi task learning may include calculating a loss value of the classified representative question, a loss value of the classified category, and a loss value of the classified named entity, and adjusting a weight of a deep learning model used for the multi-tasking learning based on the calculated loss values.

Performing the multi task learning may include performing global encoding and sequential encoding on an input sequence corresponding to the input data.

BRIEF DESCRIPTION OF THE DRAWINGS

These and other aspects of the disclosure will become apparent and more readily appreciated from the following description of the embodiments, taken in conjunction with the accompanying drawings of which:

FIG. 2 is a diagram illustrating an example of information stored in a memory of a question-and-answer system according to an embodiment;

FIG. 3 is a diagram illustrating an example of an extended sentence used for learning of a question-and-answer system according to an embodiment;

FIG. 7 is a table showing an example of a feature extraction result of a question-and-answer system according to an embodiment;

FIG. 8 is a table showing an example of a format conversion result of a question-and-answer system according to an embodiment;

FIG. 13 is a table showing performance test results of a question-and-answer system according to an embodiment;

DETAILED DESCRIPTION

Figure 1:
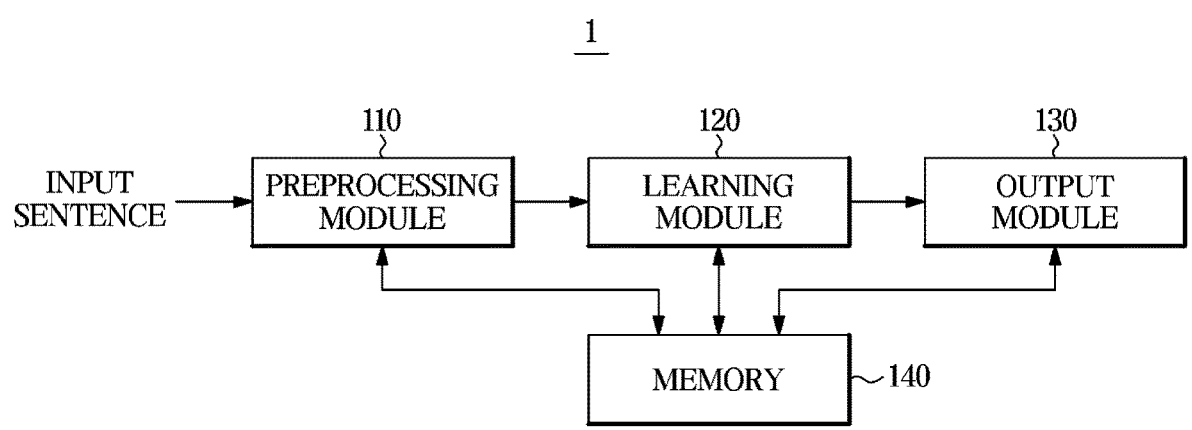
FIG. 1 is a control block diagram illustrating a question-and-answer system according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The embodiments set forth herein and illustrated in the configuration of the disclosure are only preferred embodiments, so it should be understood that they may be replaced with various equivalents and modifications at the time of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise.

The terms, such as "part", "device", "block", "member", "module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Although the terms "first," "second," "A," "B," etc. may be used to describe various components, the terms do not limit the corresponding components, but are used only for the purpose of distinguishing one component from another component.

Reference numerals used for method operations are just used for convenience of explanation, but not to limit an order of the operations. Thus, unless the context clearly dictates otherwise, the written order may be practiced otherwise.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Hereinafter, an embodiment of a question-and-answer system and a method of controlling the same according to an aspect will be described in detail with reference to the accompanying drawings.

FIG. 1 is a control block diagram illustrating a question-and-answer system according to an embodiment, FIG. 2 is a diagram illustrating an example of information stored in a memory of a question-and-answer system according to an embodiment, and FIG. 3 is a diagram illustrating an example of an extended sentence used for learning of a question-and-answer system according to an embodiment.

Referring to FIG. 1, a question-and-answer system 1 according to an embodiment is illustrated. As shown, the question-and-answer system 1 includes a memory 140 in which a plurality of representative questions are stored to match a plurality of answers respectively corresponding to the plurality of representative questions, a learning module 120 configured to output a representative question corresponding to an input sentence from among the stored plurality of representative questions, and an output module 130 configured to search the memory 140 for an answer that matches the output representative question and output the found answer.

The question-and-answer system 1 according to certain embodiments is a system that provides an answer to a question uttered by a user. Here, the question uttered by the user may be a predetermined frequently asked question (FAQ), and the question-and-answer system 1 may output an answer to the predetermined FAQ.

When the question-and-answer system 1 is associated with a vehicle, the question uttered by the user may be a vehicle-related FAQ. Accordingly, the question-and-answer system 1 may output an answer to the vehicle-related FAQ uttered by the user.

To this end, in the memory 140, a plurality of representative questions for respective FAQs related to a vehicle may be stored to match answers corresponding thereto, in the form of a question-and-answer pair as in the example of FIG. 2.

Meanwhile, even for questions having the same content, the sentences uttered by the user may have different forms. That is, the user may not need to utter the same sentence as that of the representative question stored in the memory 140, and may utter another type of sentence having the same meaning as the representative question stored in the memory 140.

Accordingly, the learning module 120 of the question-and-answer system 1 may identify a representative question corresponding to an arbitrary sentence uttered by the user from among the plurality of representative questions stored in the memory 140.

To this end, the learning module 120 may perform learning using a plurality of learning data sets including input data and output data, in which a plurality of extended sentences may be used as input data, and a plurality of representative questions corresponding respectively to the plurality of extended sentences may be used as output data.

Referring to FIG. 3, the extended sentence refers to a sentence that is different from the representative question, but has the same meaning as the representative question. For example, a representative question "What is an auto-hold?", and a sentence "What is the function that does not need to keep stepping on the brake?" having the same meaning as the representative question may be used as an extended sentence for learning.

As for a representative question "How do I turn on the steering wheel hot wire?", a sentence "I want to turn on the hand heater. What should I do?" that has the same meaning as the representative question may be used as an extended sentence for learning. The question-and-answer system 1 according to the embodiment may use a plurality of extended sentences for one representative question, for learning.

The question-and-answer system 1 according to the embodiment may be configured to, in performing the above-described learning, perform multi-task learning of simultaneously learning a representative question corresponding to an input sentence and a category to which the input sentence belongs. The performance of the learning module 120 may be improved by simultaneously learning tasks related to each other as such.

To this end, the question-and-answer system 1 may perform learning by using a plurality of extended sentences as input data, and by using a plurality of representative questions corresponding respectively to the plurality of extended sentences and a plurality of categories to which the plurality of extended sentences belongs, respectively, as output data.

The multi-task learning is performed based on a deep learning model. Detailed descriptions of the multi-task learning of the learning module 120 are described below.

The output module 130 may search the memory 140 for a representative question corresponding to the input sentence, and output an answer matching the found representative question.

Meanwhile, the input sentence uttered by the user may be converted into an appropriate format that may be processed by the deep learning model before being input to the learning module 120. To this end, the question-and-answer system 1 may include a pre-processing module 110 that converts the format of the input sentence.

Hereinafter, a pre-processing process for an utterance of a user will be described.

Figure 4:
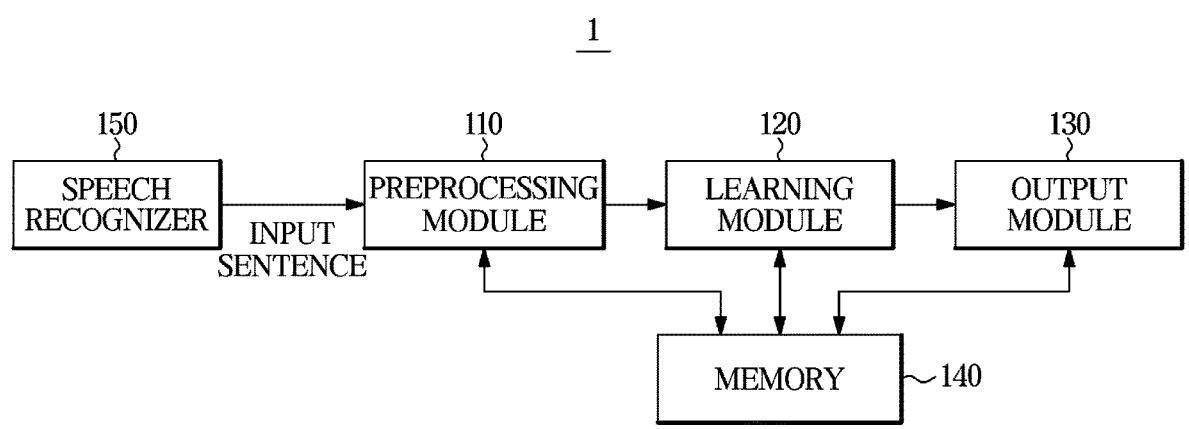
FIG. 4 is another control block diagram illustrating a question-and-answer system according to an embodiment.
Figure 5:
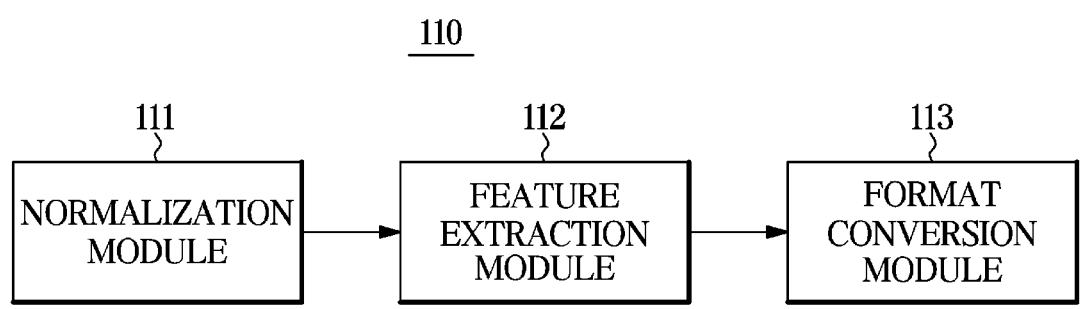
FIG. 5 is a control block diagram specifically illustrating a configuration of a pre-processing module of a question-and-answer system according to an embodiment.

FIG. 4 is another control block diagram illustrating a question-and-answer system according to an embodiment. FIG. 5 is a control block diagram specifically illustrating a configuration of a pre-processing module of a question-and-answer system according to an embodiment.

Referring to FIG. 4, the question-and-answer system 1 according to the embodiment may further include a speech recognizer 150 that converts an utterance of a user, which is a speech signal, into text, that is, a sentence.

The speech recognizer 150 may be implemented as a speech to text (STT) engine, and may apply a speech recognition algorithm to an utterance of a user to convert the utterance into text.

For example, the speech recognizer 150 may use feature vector extraction technologies, such as Cepstrum, Linear Predictive Coefficient (LPC), Mel Frequency Cepstral Coefficient (MFCC) or Filter Bank Energy, to extract a feature vector from an utterance of a user.

Then, the speech recognizer 150 may compare the extracted feature vector with a trained reference pattern to obtain a recognition result. To this end, an acoustic model that models and compares signal characteristics of a speech or a language model that models a linguistic order relationship of words or syllables corresponding to a recognized vocabulary may be used.

In addition, the speech recognizer 150 may also convert an utterance of a user into text based on a learning using a machine learning or deep learning. In the present embodiment, there is no restriction on a method of converting an utterance of a user into text by the speech recognizer 150, and the speech recognizer 150 may convert an utterance of user into spoken text by applying various speech recognition technologies in addition to the above-described method.

The input sentence corresponding to the utterance of the user may be input to the pre-processing module 110 and converted into a form that may be processed by the deep learning model.

Referring to FIG. 5, the preprocessing module 110 may include a normalization module 111 for normalizing the input sentence, a feature extraction module 112 for extracting features from the input sentence, and a format conversion module 113 for converting the format of the input sentence.

The normalization module 111 may perform normalization to exclude meaningless data, such as special characters and symbols, from the input sentence. It is assumed that all input sentences processed in the components described below are normalized input sentences.

The feature extraction module 112 may extract features from the normalized input sentence, and the format conversion module 113 may assign indexes to the input sentence based on the extracted features.

Figure 6:
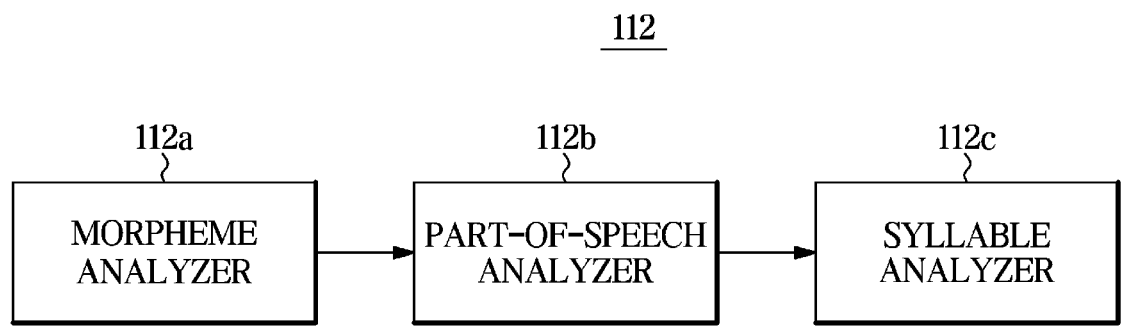
FIG. 6 is a control block diagram specifically illustrating a configuration of a feature extraction module in a question-and-answer system according to an embodiment.

FIG. 6 is a control block diagram illustrating a configuration of a feature extraction module in a question-and-answer system according to an embodiment.

Referring to FIG. 6, the feature extraction module 112 may include a morpheme analyzer 112a, a part-of-speech analyzer 112b, and a syllable analyzer 112c.

The morpheme analyzer 112a divides the input sentence in units of morphemes, and the part-of-speech analyzer 112b analyzes the part-of-speech for each morpheme and tags the part-of-speech for each morpheme.

The syllable analyzer 112c may divide the input sentence in units of syllables. Because not only morphemes but also syllables are used as features, an unknown word or an infrequent word may be analyzed, so that the performance of the learning module 120 may be improved.

Figure 9:
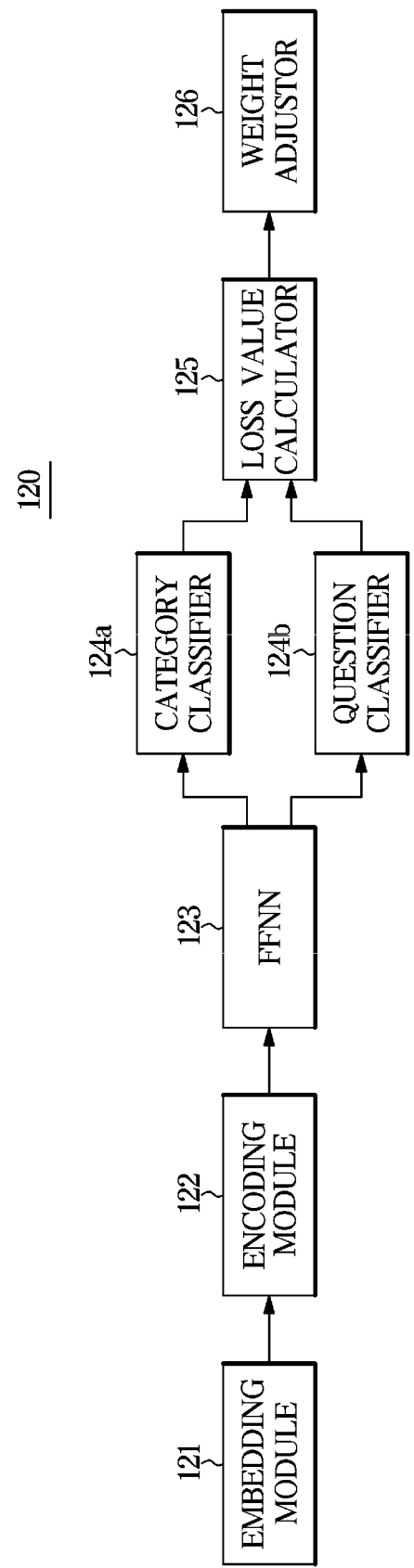
FIG. 9 is a control block diagram illustrating a learning module of a question-and-answer system according to an embodiment.

FIG. 7 is a table showing an example of a feature extraction result of a question-and-answer system according to an embodiment. FIG. 8 is a table showing an example of a format conversion result of a question-and-answer system according to an embodiment. An input sentence of the example described in FIGS. 8 and 9 is a Korean sentence.

The following description is made on results obtained when the input sentence is " 안전벨트가 빠지지 않는데 어떻게 해야 하지 ? (The seat belt won't come off, what should I do?)".

Referring to FIG. 7, the normalization module 111 may perform normalization on the input sentence to remove a special character "?".

The morpheme analyzer 112a divides the normalized input sentence in units of morphemes, to output a result " 안전, 벨트, 가, 빠지, 지, 않, 는데, 어떻게, 하, 아야, 하, 지 ".

The part-of-speech analyzer 112b may analyze the part-of-speech of each morpheme and tag the analyzed part-of-speech to each morpheme, to output a result " 안전/NNG 벨트/NNG 가/JKS, 빠지/VV, 지/EC, 않/VX, 는데/EC, 어떻게/MAG 하/VV, 아야/EC, 하/VX, 지/EF ". NNG, JKS, VV, EC, VX, MAG, and EF denote the part-of-speech respectively according to a part-of-speech tagging dictionary. The NNG denotes common nouns. The JKS denotes subject case markers. The VV denotes verbs. The EC denotes connective endings. The VX denotes auxiliary predicate elements. The MAG denotes adverbs. The EF denotes sentence-closing ending.

The syllable analyzer 112c may divide the normalized input sentence in units of syllables, to output a result " 안, 전, 벨, 트, 가, 빠, 지, 지, 않, 는, 데, 어, 떻, 게, 해, 야, 하, 지 ".

According to the embodiment, the input sentence is divided not only in units of morphemes but also in units of syllables, so that the input sentence may be subject to both word embedding and character embedding as will be described below.

As described above, the format conversion module 113 may perform indexing on the input sentence based on the feature extraction result. Specifically, the format conversion module 113 may assign an index to each of a plurality of words or a plurality of features constituting the input sentence using a predefined dictionary. The index assigned in the format conversion process may indicate the position of a word in the dictionary.

The format conversion module 113 may perform indexing on the normalized input sentence " 안전벨트가 빠지지 않는데 어떻게 해야 하지 " in units of morphemes or in units of syllables as shown in FIG. 8. Indexes assigned to the input sentence by the format conversion module 113 may be used in an embedding process to be described below.

In the following embodiment to be described below, the input sentence on which pre-processing has been completed will be referred to as an input sequence. The input sequence may be processed in units of tokens, and in the present example, tokens in units of morphemes are used.

Figure 10:
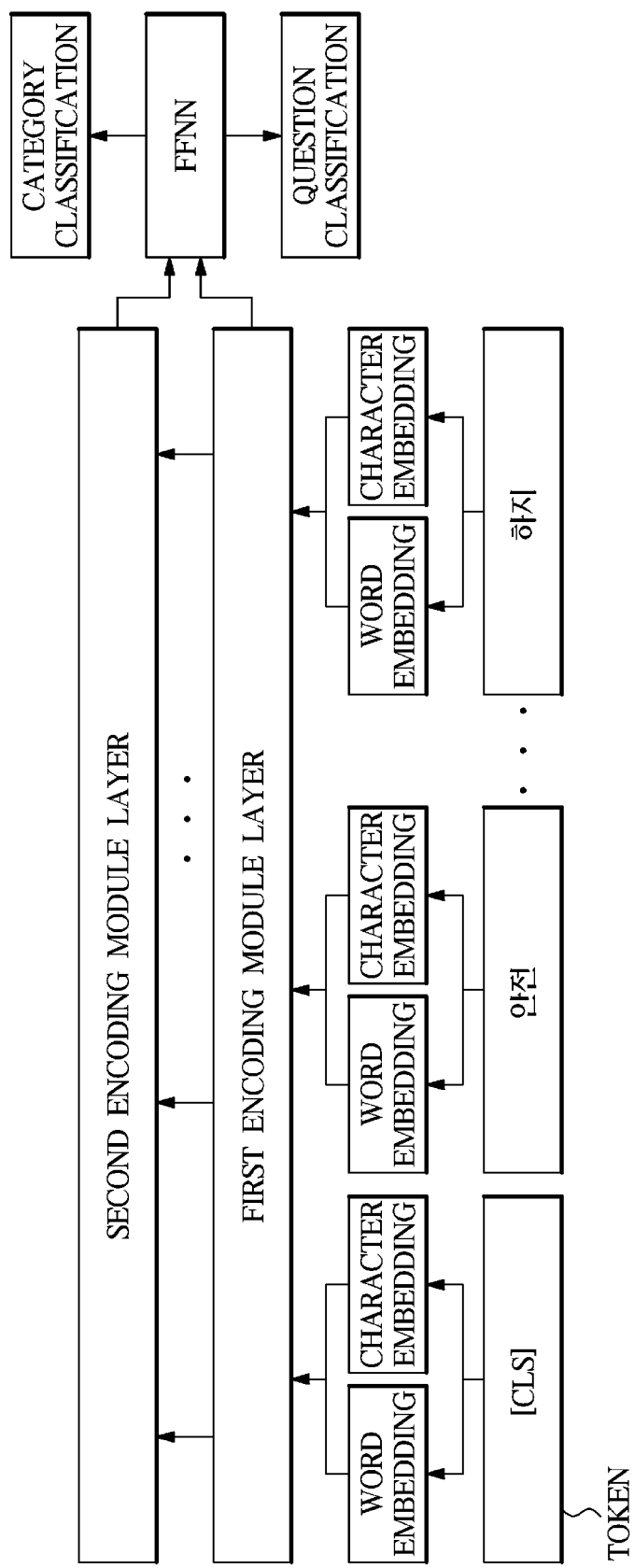
FIG. 10 is a diagram illustrating layer-specific operations of a learning module of a question-and-answer system according to an embodiment.

FIG. 9 is a control block diagram illustrating a learning module of a question-and-answer system according to an embodiment. FIG. 10 is a diagram illustrating layer-specific operations of a learning module of a question-and-answer system according to an embodiment.

According to the embodiment, the learning module 120 may include a multi-task deep learning model that simultaneously learns a representative question and a category corresponding to an input sentence. Referring to FIG. 9, the learning module 120 includes an embedding module 121, an encoding module 122, a feed forward neural network (FFNN) 123, a category classifier 124a, a question classifier 124b, a loss value calculator 125, and a weight adjuster 126.

The embedding module 121 performs embedding to vectorize the input sequence. For example, the embedding module 121 may perform the embedding by applying a one-hot vector encoding method.

Specifically, when k words exist, a k-dimensional 0 vector may be generated, and only a corresponding word may be represented with an index of 1. To this end, redundant words are removed, the remaining words are listed, each of the words is converted into a one-hot vector, and the converted one-hot vectors are used to generate each sentence.

Referring to FIG. 10, a [CLS] token may be added to the input sequence input to the learning module 120. Through the encoding process described below, the vector for the [CLS] token may imply the meaning of the input sentence.

According to the embodiment, the embedding module 121 may perform character embedding as well as word embedding. As described above, since the feature extraction module 112 extracts not only morpheme-unit features but also syllable-unit features, the syllable-unit features may also be input to the embedding module 121 and used for character embedding.

Since syllable-unit information provides information about similarity of a word and is applicable to unknown or infrequent words that are not included in the word dictionary, use of both word-unit information and syllable-unit information may improve the performance of the deep learning model.

Meanwhile, pre-training may be used for word embedding and character embedding. For example, for Korean, word embedding may be pre-trained by a neural network language model (NNLM), and character embedding may be pre-trained by GloVe (Pennington et al., 2014). For English, word embedding and character embedding may be pre-trained by FastText (Bojanowski et al., 2017). When pre-trained embedding is used, the speed and performance of the deep learning model may be improved.

The embedding module 121 may output a word embedding vector $e_i^w = emb_w(q_i)$ generated by performing word embedding on the input sequence and a character embedding vector $e_i^c = CNN_c(qi)$ generated by performing character embedding on the input sequence, and the two types of embedding vectors may be concatenated and input to the encoding module 122.

The encoding module 122 may encode tokens of the input sequence represented as a vector through the embedding. The question-and-answer system 1 according to certain embodiments only classifies an input sequence without generating a new output sentence, and thus decoding may be omitted.

In order to improve the performance, the encoding module 122 may include a first encoding layer performing global encoding and a second encoding layer performing sequential encoding. Each of the first encoding layer and the second encoding layer may include a plurality of hidden layers.

The first encoding layer performing global encoding may encode the entire input sequence at once. The second encoding layer performing sequential encoding may sequentially receive tokens and perform encoding. The encoding module 122 according to the embodiment may perform both global encoding and sequential encoding to thereby improve the accuracy of information regarding the order or position of words in the input sentence.

The first encoding layer and the second encoding layer may be implemented by various algorithms. For example, the first encoding layer may use an attention algorithm. According to the attention algorithm, a part of the entire input sequence that is related to a word to be predicted at a specific point in time may be referenced with attention.

As an example, the first encoding layer may use an encoder of a transformer (Vaswani et al., 2017) including a plurality of self-attention layers, and the second encoding layer may use an algorithm, such as a recurrent neural network (RNN) and bidirectional gated recurrent units (BiGRU), for sequential encoding.

In this case, hidden states $s_i$ of the first encoding layer may each be input to the second encoding layer, and the second encoding layer may bidirectionally encode the hidden states to generate a sequentially encoded context vector $r_i$. The output $s_i$ of the first encoding layer and the output $r_i$ of the second encoding layer may be expressed by Equation 1 below.

$$s_i = \text{Transfomer}(e_i)$$

$$r_i = \text{BiRNN}(r_{i-1}, s_i) \qquad \text{[Equation 1]}$$

In Equation 1, $e_i$, the input of the first encoding layer, is a dense vector in which a word embedding vector and a character embedding vector are concatenated.

On the other hand, the respective hidden states $s_i$ of the first encoding layer may be input to the second encoding layer, and the hidden state $s_{[CLS]}$ of the [CLS] token of the first encoding layer may be input to the feed forward neural network 123. The hidden state $s_{[CLS]}$ of the [CLS] token may imply the meaning of the entire input sentence.

The last hidden state $r_n$ of the second encoding layer may also be input to the feed forward neural network 123. That is, the hidden state $s_{[CLS]}$ of the [CLS] token of the first encoding layer and the last hidden state $r_n$ of the second encoding layer may be concatenated and input to the feed forward neural network 123.

As described above, the learning module 120 may simultaneously learn question classification and category classification. To this end, the feed-forward neural network 123 may perform a linear operation using a shared parameter for question classification and category classification. By passing through the feed-forward neural network 123, the output of the first encoding layer and the output of the second encoding layer may be more naturally concatenated.

The output of the feed forward neural network 123 may be input to each of the question classifier 124a and the category classifier 124b.

The question classifier 124a may determine a representative question corresponding to the input sentence from among a plurality of predefined representative questions. For example, about 1500 representative questions may be predefined, and the question classifier 124a may use a linear function having a parameter shared with the category classifier 124b through the feed forward neural network 123.

On the other hand, the question-and-answer system 1 according to the embodiment may, in order to embed the representative question into a sentence vector, use a language model Bidirectional Encoder Representations from Transformers (BERT) (Reimers and Gurevych, 2019) to improve the performance of the question classifier 124a.

The question classifier 124a may compare the sentence vector of the representative question with the encoded input sequence to classify a representative question corresponding to the input sentence. For example, the question classifier 124a may match the input sequence with the representative question using a softmax function, which is an activation function used in a classification task.

The category classifier 124b may determine a category to which the input sentence belongs from among a plurality of predefined categories.

For example, vehicle-related FAQs may be classified based on the subject of the question into categories of basic guidelines and information, safety precautions, safety system, dashboard, convenience (features, starting and driving your vehicle, emergency situations, maintenance, trouble shooting, check trouble, how to maintain, such as my car info, and the like.

The category classifier 124b may identify a category to which the input sentence belongs among the above exemplified categories. Similar to the question classifier 124a, a softmax function may be used to match the input sequence with the category.

Meanwhile, in order to improve the performance of category classification, in certain embodiments, the question-and-answer system 1 aaamay allow the output of the feed-forward neural network 123 to pass through a variational inference network before being input to the category classifier 124b.

The variational inference network may operate, under the assumption that a latent variable z exists in a semantic space of a high dimension, as in manifold learning, to transform data into a low-dimensional space through learning and extract a semantic feature to generate a robust deep learning model.

When the question classifier 124a and the category classifier 124b output the representative question and the category corresponding to the input sentence, respectively, the loss calculator 125 may calculate a loss value for the question classification and a loss value for the category classification. In addition, the loss value calculator 125 may calculate a total loss value by summating the two loss values.

For example, the loss calculator 125 may use cross-entropy as a loss function. When the loss value for the question classification is represented by $L_q$ and the loss value for the category classification is represented by $L_c$, the total loss value L may be expressed as Equation 2 below.

$$L = \alpha L_q + \beta L_c \quad \text{[Equation 2]}$$

Here, hyperparameters $\alpha$ and $\beta$ may denote weights optimized for the question classification and the category classification, respectively.

The weight adjuster 126 may adjust the weights of the hidden layers of the deep learning model in a direction to minimize the calculated total loss value.

Figure 11:
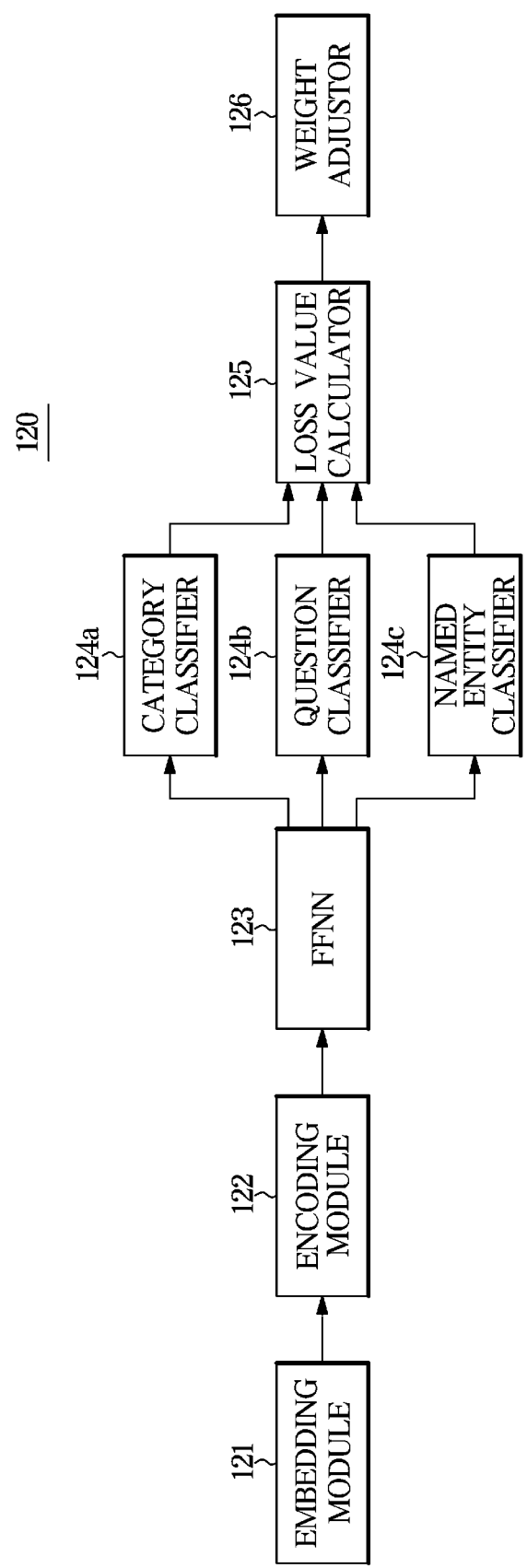
FIG. 11 is a control block diagram specifically illustrating a learning module of a question-and-answer system according to an embodiment.
Figure 12:
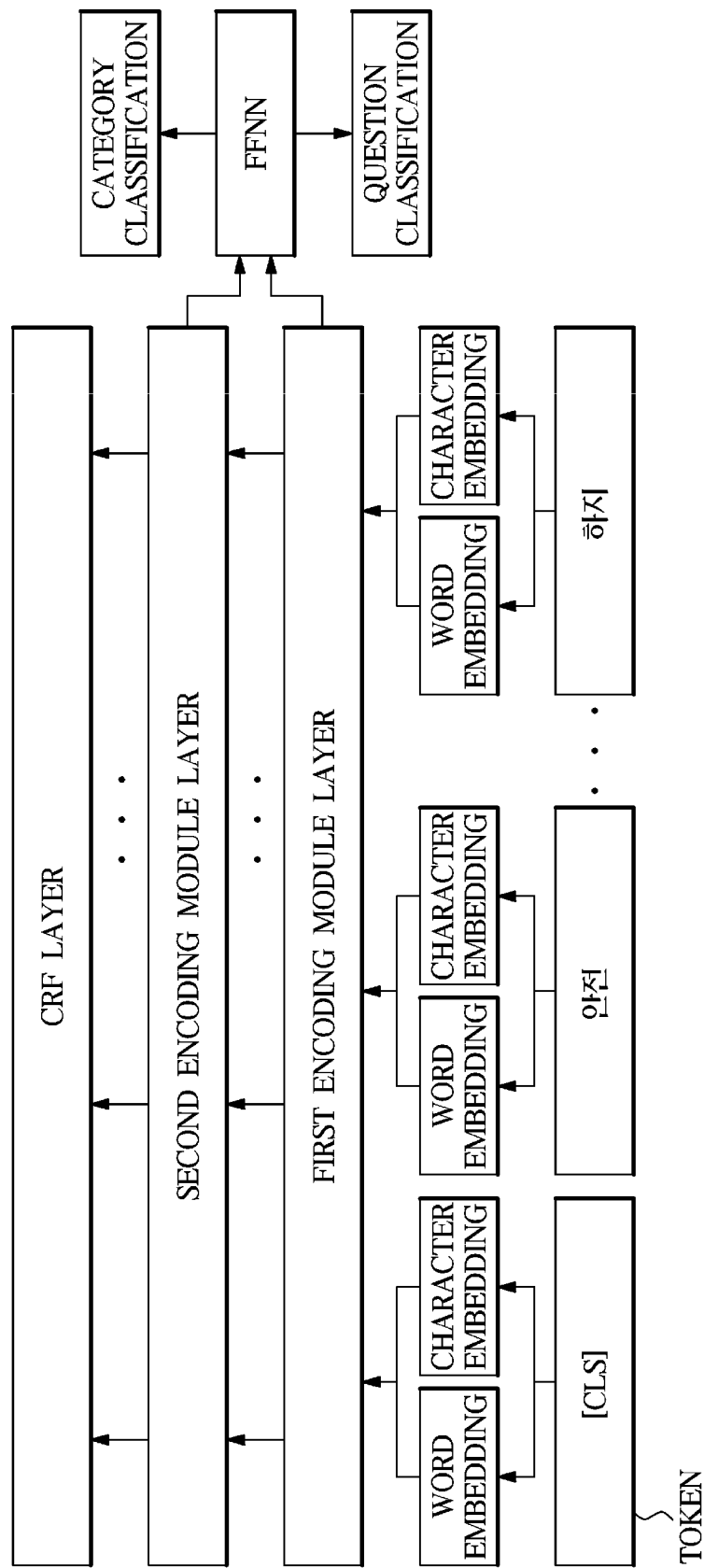
FIG. 12 is a diagram illustrating layer-specific operations of a learning module of the question-and-answer system of FIG. 11.

FIG. 11 is a control block diagram specifically illustrating a learning module of a question-and-answer system according to an embodiment. FIG. 12 is a diagram illustrating layer-specific operations of a learning module of the question-and-answer system of FIG. 11.

As described above, embodiments of the question-and-answer system 1 may improve the performance of the deep learning model by simultaneously learning question classification and category classification, which are related tasks. As another example, the question-and-answer system 1 may additionally learn classification of a vehicle-related named entity. The vehicle-related named entity may indicate a term related to a vehicle.

To this end, referring to FIG. 11, the learning module 120 may further include a named entity classifier 124c in addition to the question classifier 124a and the category classifier 124b.

The operation of the named entity classifier 124c may be defined as named entity recognition (NER). NER is one of information extraction tasks for finding a specific type of word in a sentence, and the named entity classifier 124c may perform NER to find a word related to a vehicle in an input sentence.

For the classification of a named entity, vehicle-related named entity labels may be predefined. The vehicle-related named entity label may have two identifiers: a type and a role. For example, the type may include a vehicle model, a body, a chassis, safety, a traffic safety, an instrument panel, infotainment, air conditioning, convenience feature, driving, maintenance, personal data, and transaction, and for each type, a plurality of roles may be determined.

Referring to FIG. 12, the named entity classifier 124c may be implemented as a conditional random field (CRF) layer (Lample et al., 2016). Each hidden state of the second encoding layer may be input to the CRF layer. That is, in Equation 1, the output r of the second encoding layer may be input to the CRF layer.

The named entity classifier 124c may label each token in the input sequence with a B-I-O tag. B may be assigned to a part at which a vehicle-related named entity begins, I may be assigned to a part belonging to a vehicle-related named entity, and O may be assigned to a part that is not a vehicle-related named entity.

When the question classifier 124a, the category classifier 124b, and the named entity classifier 124c output the representative question, the category, and the named entity corresponding to the input sentence, respectively, the loss calculator 125 may calculate the loss value for the question classification, the loss value for the category classification and the loss value for the named entity recognition, respectively. In addition, the loss calculator 125 may calculate a total loss value by summating the three loss values.

For example, the loss calculator 125 may use cross-entropy as a loss function. When the loss value for the question classification is represented by $L_q$, the loss value for the category classification is represented by $L_c$, and the loss value for the named entity recognition is represented by $L_e$, the total loss value L may be expressed as in Equation 3 below.

$$L = \alpha L_q + \beta L_c + \gamma L_e \quad \text{[Equation 3]}$$

Here, hyperparameters α, β, and γ may be weights optimized for the question classification, the category classification, and the named entity recognition, respectively.

The weight adjuster 126 may adjust weights of hidden layers of the deep learning model in a direction to minimize the calculated total loss value.

FIG. 13 is a table showing performance test results of a question-and-answer system 1 according to an embodiment.

A simple RNN model was set as a baseline. or each of the RNN model and the deep learning model (represented by our model) applied to the question-and-answer system 1 according to the embodiment, the accuracy FAQ acc of question classification, and the accuracy Cat. acc of category classification, and the accuracy NER F1 of named entity recognition were calculated. In addition, the processing time (ms/sent) for each sentence was also calculated.

Referring to FIG. 13, the deep learning model applied to the question-and-answer system 1 has an accuracy of 85.24% of question classification, an accuracy of 87.94% of category classification, and an accuracy of 74.79% of named entity recognition for Korean, and has an accuracy of 82.95% of question classification, an accuracy of 79.42% of category classification, and an accuracy of 73.56% of named entity recognition for English. It can be seen that, compared to the RNN model and the BERT model, an improved performance is provided without a significant increase in processing time.

The above-described operation of the question-and-answer system 1 may be implemented by a computer program. The question-and-answer system 1 may include at least one memory in which the program is stored, and at least one processor for executing the stored program. Components, such as the speech recognizer 150, the preprocessing module 110, the learning module 120, and the output module 130, are not distinguished by the physical configuration, but are distinguished by the operation thereof. Accordingly, the components do not need to be implemented by a separate memory or processor, and at least some of the components may share a memory or a processor.

The question-and-answer system 1 according to the embodiment may be implemented in a vehicle, or it may be implemented in a server connected through communication with a vehicle. Hereinafter, a case in which the question-and-answer system 1 is implemented in a server will be described as an example.

Figure 14:
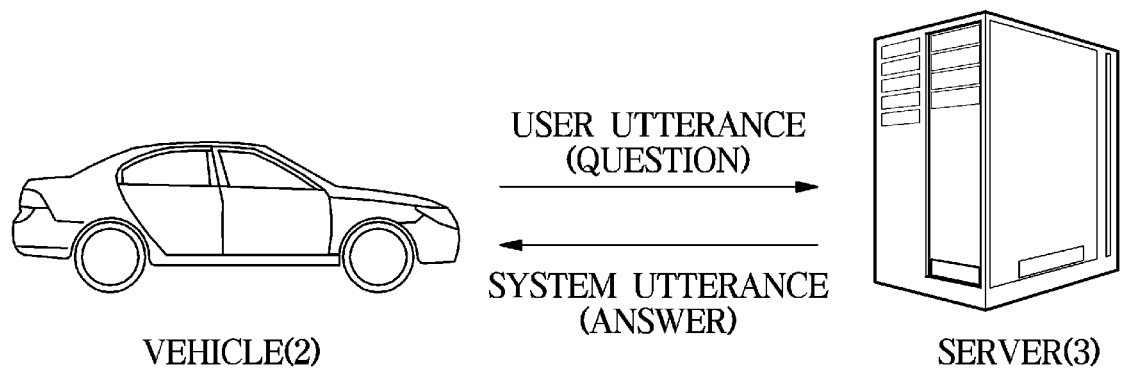
FIG. 14 is a diagram illustrating information exchanged between a vehicle and a server.
Figure 15:
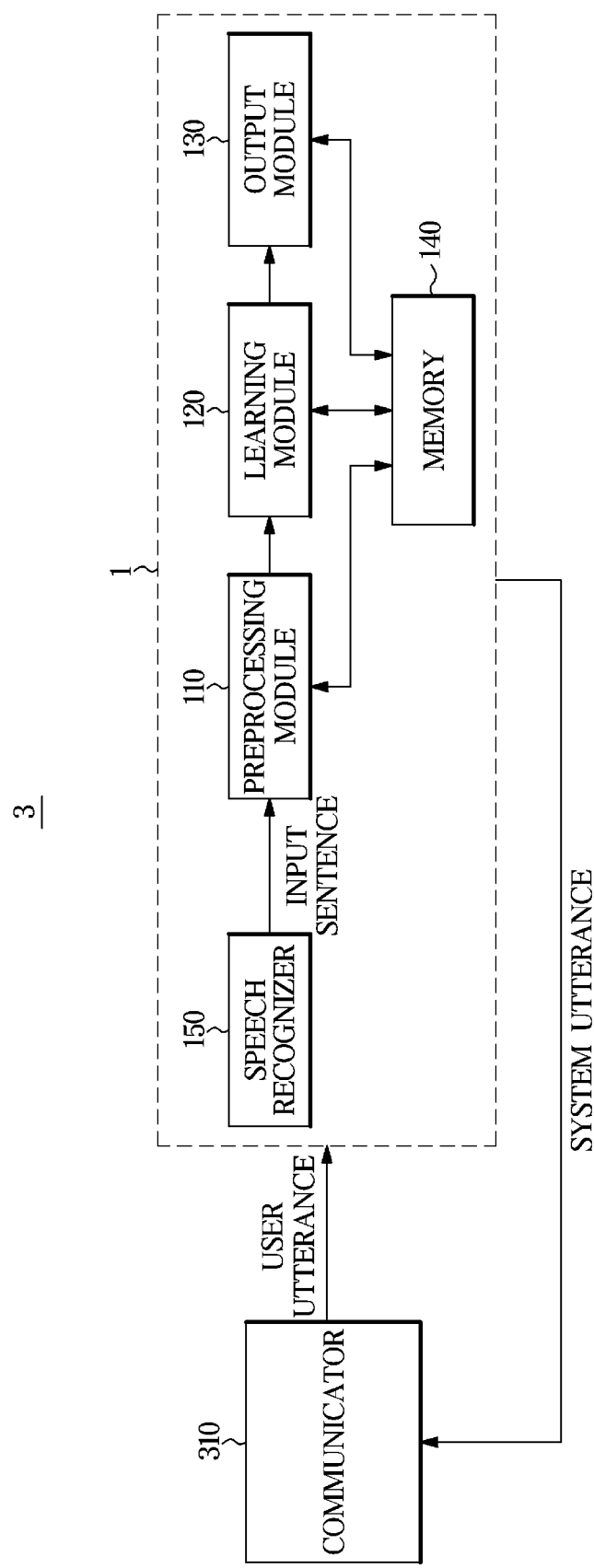
FIG. 15 is a control block diagram illustrating a server including a question-and-answer system.
Figure 16:
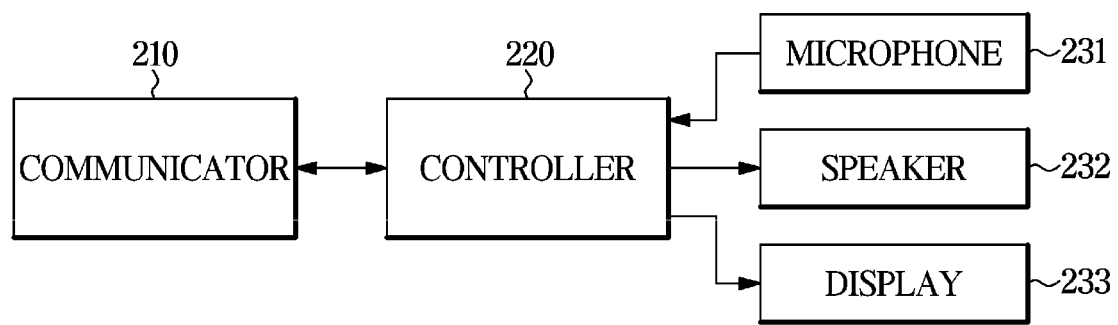
FIG. 16 is a control block diagram illustrating a vehicle connected to a server including a question-and-answer system.

FIG. 14 is a diagram illustrating information exchanged between a vehicle and a server. FIG. 15 is a control block diagram illustrating a server including a question-and-answer system. FIG. 16 is a control block diagram illustrating a vehicle connected to a server including a question-and-answer system.

Referring to FIG. 14, when a user of a vehicle 1 inputs an utterance, the inputted user utterance may be transmitted to a server 3. The utterance of the user may include a vehicle-related question, and the server 3 including the question-and-answer system 1 may transmit a system utterance including an answer to the vehicle-related question to the vehicle 1.

Referring to FIG. 15, the server 3 may include a communicator 310 that transmits and receive signals to and from the vehicle 1 by communicating with the vehicle 1, and the question-and-answer system 1 described above. The communicator 310 may communicate with the vehicle 1 by employing at least one of various wireless communication methods, such as 4G, 5G, and WiFi®.

The communicator 310 may receive an utterance of a user transmitted from the vehicle 1 in the form of a speech signal.

The speech recognizer 150 of the question-and-answer system 1 converts the utterance of the user into text (an input sentence) according to the method described above and input the text to the pre-processing module 110.

When the learning module 120, on which learning has been completed, is used in practice, category classification, loss value calculation, and weight adjustment may be omitted from the above-described operations of the question-and-answer system 1. Except for the category classification, loss calculation, and weight adjustment, the input sentence may be subject to preprocessing, embedding, and encoding and then classification of a representative question corresponding to the input sentence in the same manner as the above.

When the learning module 120 outputs the representative question corresponding to the input sentence, the output module 130 may search the memory 140 for an answer corresponding to the representative question, and transmit the found answer to the vehicle 1 through the communicator 310.

The output module 130 may transmit the found answer in the form of text or in the form of a speech signal. When transmitting the answer in the form of a speech signal, a text to speech (TTS) engine may be included in the output module 130.

Referring to FIG. 16, the vehicle 2 may include a communicator 210 to communicate with the server 3 and a controller 220 to control the vehicle 2, and a microphone 231, a speaker 232, and a display 233 corresponding to a user interface.

An utterance of the user input to the microphone 231 may be converted into a form of a speech signal and then transmitted to the server 3 through the communicator 210. The communicator 210 of the vehicle 2 may also employ at least one of various wireless communication methods such as 4G, 5G, and WiFi® in communicating with the server 3.

When an answer corresponding to the question uttered by the user is transmitted from the server 3, the communicator 210 may receive the answer, and the controller 220 may output the answer using the speaker 232 or the display 233 according to the type of the answer.

For example, when the answer transmitted from the server 3 is text, the answer may be visually output the answer through the display 233, and when the answer transmitted from the server 3 is a speech signal, the speaker 232 may audibly output the answer through the speaker 232.

Alternatively, even when the answer transmitted from the server 3 is text, the TTS engine included in the vehicle 1 may convert the transmitted answer into a speech signal, and output the answer converted into the voice signal through the speaker 232.

A method of controlling a question-and-answer system according to an embodiment will now be described. In implementing the method of controlling the question-and-answer system 1 according to the embodiment, the above described question-and-answer system 1 may be used. Accordingly, the contents described above with reference to FIGS. 1 to 16 may be equally applied to the method of controlling the question-and-answer system 1, unless otherwise mentioned.

Figure 17:
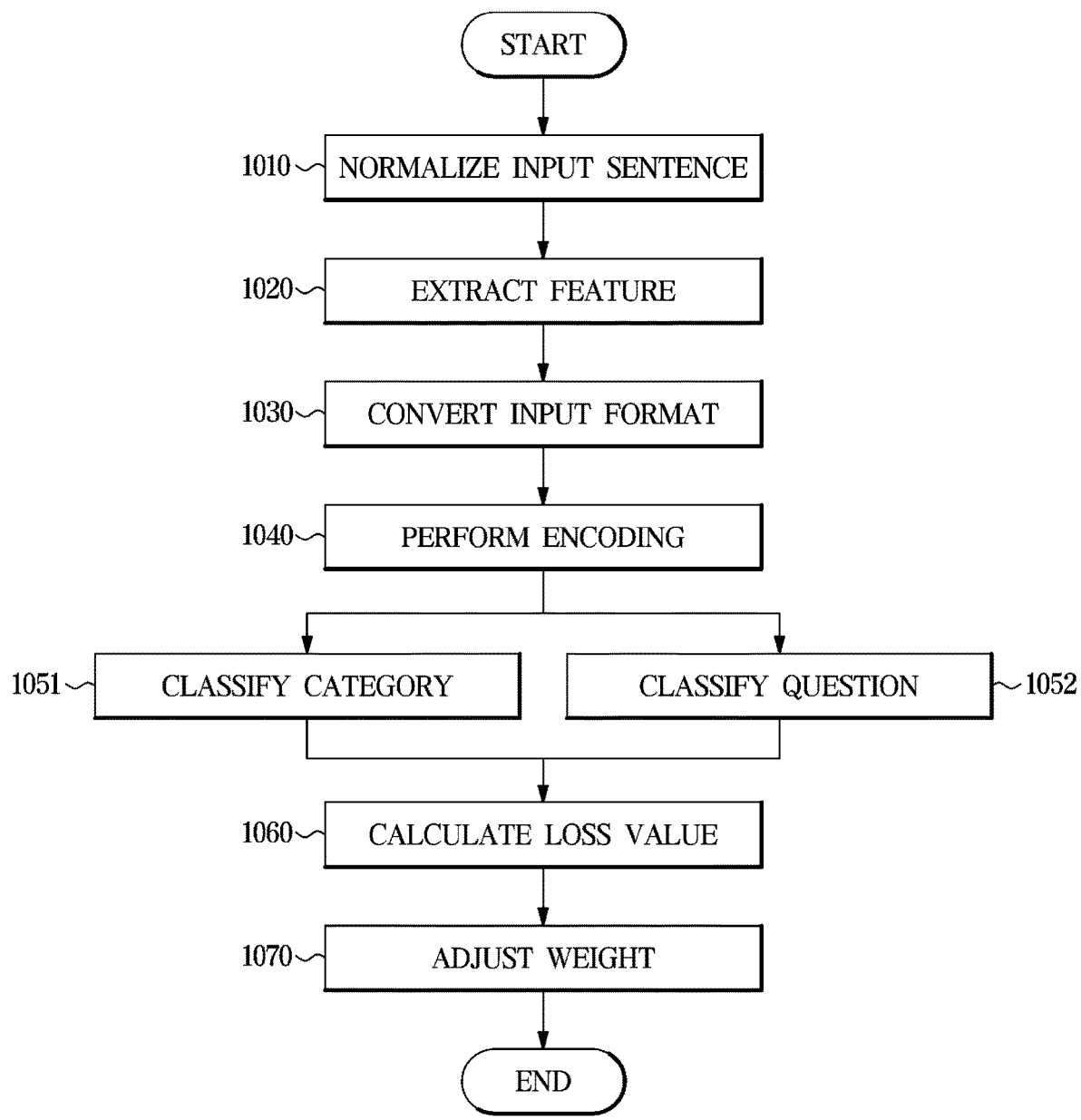
FIG. 17 is a flowchart showing a method of controlling a question-and-answer system according to an embodiment.

FIG. 17 is a flowchart showing a method of controlling a question-and-answer system according to an embodiment. The method shown in the flowchart is a method performed in a learning operation of the question-and-answer system.

First, in order to perform the method of controlling the question-and-answer system, an input sentence may be input to the preprocessing module 110. The input sentence input to the preprocessing module 110 in the learning operation is an extended sentence as shown in the example of FIG. 3 described above.

Referring to FIG. 17, the preprocessing module 110 normalizes the input sentence in block 1010. In the normalization operation of the input sentence, meaningless data, such as special characters and symbols, may be excluded from the input sentence. All input sentences in the operations to be described below refer to normalized input sentences.

The preprocessing module 110 extracts a feature from the input sentence in block 1020. The features extracted from the input sentence may include a morpheme, a parts of speech, a syllable, and the like. Specifically, the preprocessing module 110 may divide the input sentence in units of morphemes, and the part-of-speech analyzer 112b may analyze the part-of-speech for each morpheme and tag the part-of-speech for each morpheme. Additionally, when the input sentence is also divided in units of syllables and used as a feature, an unknown word or an infrequent word may also be analyzed, so that the performance of the learning module 120 may be improved.

The pre-processing module 110 converts the input format of the input sentence based on the extracted features in block 1030. Converting the input format may include performing indexing on the input sentence. The preprocessing module 110 may assign an index to each of a plurality of words or a plurality of features constituting the input sentence using a predefined dictionary. The index assigned in the format conversion process may indicate the position in the dictionary.

The input sentence on which pre-processing has been completed by the above-described process will be referred to as an input sequence.

When embedding is performed on the input sequence based on the indexing result described above, the input sequence may be vectorized. In this case, both word embedding and character embedding may be performed. A word embedding vector generated by performing word embedding on the input sequence and a character embedding vector generated by performing character embedding on the input sequence may be concatenated and input to the encoding module 122.

The encoding module 122 performs encoding on the input sequence converted into a vector in block 1040. In order to improve performance, the encoding module 122 may include a first encoding layer performing global encoding and a second encoding layer performing sequential encoding. Each of the first encoding layer and the second encoding layer may include a plurality of hidden layers.

The first encoding layer performing global encoding may encode the entire input sequence at once, and the second encoding layer performing sequential encoding may sequentially receive tokens and perform encoding. By performing both global encoding and sequential encoding, the accuracy of information about the order or position of words in the input sentence may be improved. Details of the encoding method are the same as those in the embodiment of the question-and-answer system 1.

The encoding result is input to each of the question classifier 124b and the category classifier 124a. As described in the above embodiment, the encoding result may be input to the classifiers 124a and 124b after passing through the feed-forward neural network 123.

The category classifier 124a classifies categories in block 1051, and the question classifier 124b classifies representative questions in block 1052. Specifically, the category classifier 124a may determine a category to which the input sentence belongs from among predefined categories. In order to improve the category classification performance, the encoded input sequence may be input into the variational inference network before the classifying of the category.

The question classifier 124b may compare sentence vectors of the representative questions with the encoded input sequence to determine a representative question corresponding to the input sentence.

When the representative question and the category corresponding to the input sentence are determined, the loss calculator 125 calculates the loss value for the question classification and the loss value for the category classification, and summates the two loss values to calculate the total loss value in block 1053aaa.

The weight adjuster 126 may adjust the weights of the hidden layers of the deep learning model in a direction to minimize the calculated total loss value.

Figure 18:
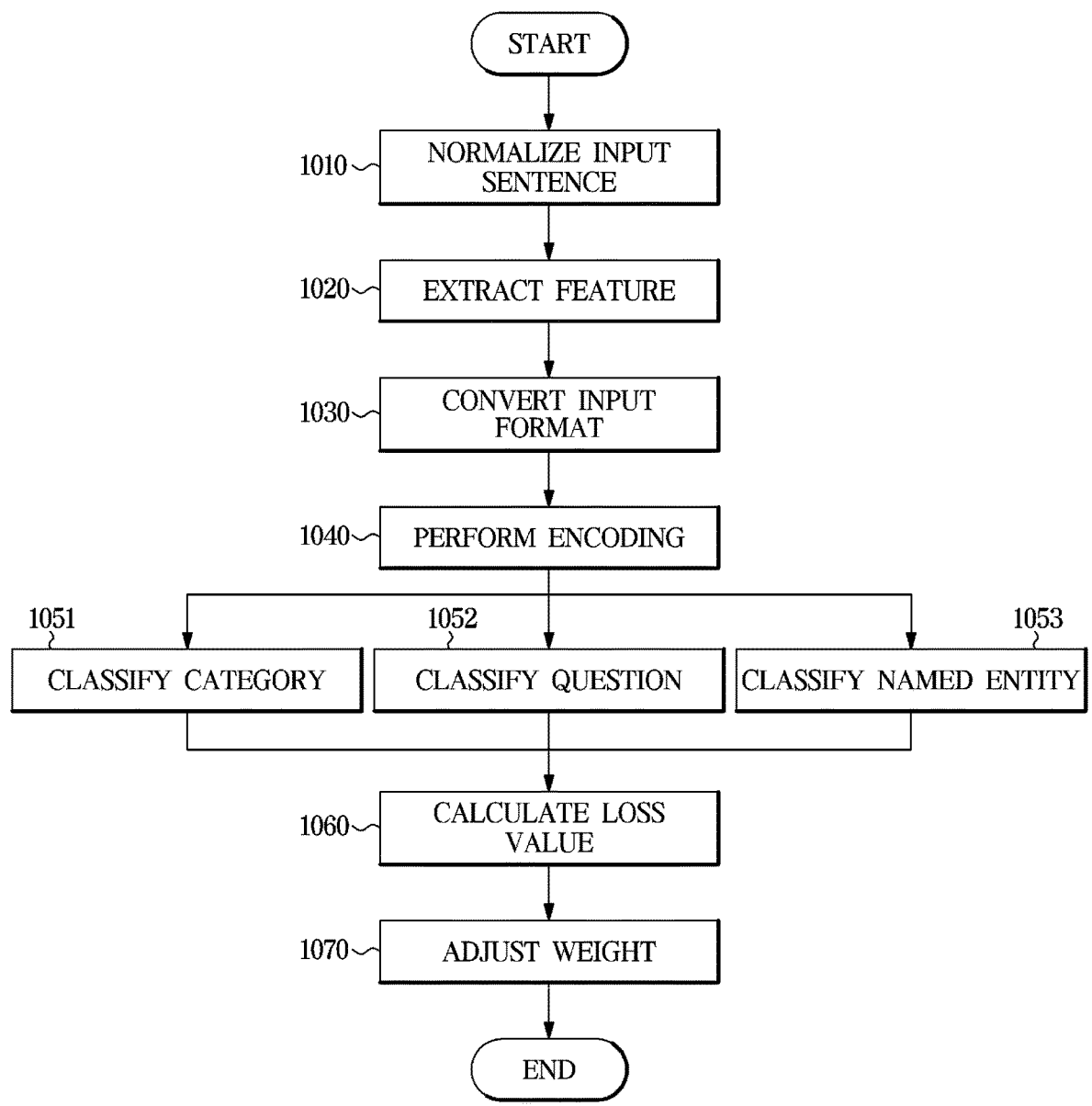
FIG. 18 is a flowchart showing a method of controlling a question-and-answer system according to an embodiment, which shows a method of additionally performing named entity recognition.

FIG. 18 is a flowchart showing a method of controlling a question-and-answer system according to an embodiment, which shows a method of additionally performing named entity recognition. The method illustrated in FIG. 18 is also performed in the learning operation of the question-and-answer system.

The operations of normalizing the input sentence in block 1010, extracting features from the input sentence in block 1020, converting the format of the input sentence in block 1030, and performing encoding in block 1040 are the same as described above in the flowchart of FIG. 17.

The encoding result is input to the named entity classifier 124c in addition to each of the question classifier 124b and the category classifier 124a. The category classifier 124a and the question classifier 124b may receive the last hidden state of the encoding module 123, and the named entity classifier 124c that needs to recognize the named entity in the entire input sequence may receive each hidden state of the encoding module 122.

The category classifier 124a may classify a category in block 1051 The question classifier 124a may classify a representative question in block 1052. The named entity classifier 124c may classify a named entity in block 1053.

For example, the named entity classification may be performed as a conditional random field (CRF) layer (Lample et al., 2016). Each hidden state of the second encoding layer may be input to the CRF layer. That is, in Equation 1, the output r of the second encoding layer may be input to the CRF layer.

After the named entity is recognized, each token in the input sequence may be labeled with a B-I-O tag. B may be assigned to a part where a vehicle-related named entity begins. I may be assigned to a part belonging to a vehicle-related named entity. O may be assigned to a part that is not a vehicle-related named entity.

When the representative question and category corresponding to the input sentence are determined, and the named entity included in the input sentence is recognized, the loss value calculator 125 may calculate the loss value for the question classification, the loss value for the category classification, and the loss value for the named entity recognition, and summate the three loss values to calculate a total loss value in block 1053.

The weight adjuster 126 may adjust the weights of the hidden layers of the deep learning model in a direction to minimize the calculated total loss value.

After multi-task learning is performed according to the above-described method, when a question is uttered by the user of the vehicle, the user's utterance is converted into an input sentence, and operations from the normalizing of the input sentence in block 1010 to the encoding in block 1040 as described above are performed. The encoded input sequence is subject to the question classification in block 1052. An answer corresponding to the representative question may be retrieved from the memory 140 and outputted to the user.

According to the above-described question-and-answer system and the method of controlling the same, the performance of the deep learning model may be improved by simultaneously learning the representative question classification and the category classification for the input sentence or simultaneously learning the representative question classification, the category classification, and the named entity classification for the input sentence, which are related tasks.

In addition, by generating such a deep learning model specialized for the vehicle and then using the deep learning model to provide answers for to vehicle-related FAQs, the hassle of the vehicle user having to search the manual to find a desired answer may be eliminated.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. A question-and-answer system comprising:
   a memory in which a plurality of representative questions are stored to match a plurality of answers corresponding respectively to the plurality of representative questions;
   a learning module configured to output a representative question corresponding to an input sentence from among the stored plurality of representative questions; and
   an output module configured to search the memory for an answer that matches the output representative question and output the searched answer;
   wherein the learning module is configured to perform multi task learning by using a plurality of extended sentences for the plurality of representative questions as input data, and by using the plurality of representative questions corresponding respectively to the plurality of extended sentences, and a plurality of categories to which the plurality of extended sentences belong, respectively, as output data;
   wherein the learning module is further configured to:
      perform the multi task learning by using the plurality of extended sentences as input data, and by using the plurality of representative questions, the plurality of categories, and a plurality of named entities included in the plurality of extended sentences, respectively, as output data;
      in the multi task learning, classify a representative question corresponding to the input data from among the stored plurality of representative questions, a category to which the input data belongs from among the plurality of categories, and a named entity included in the input data from among the plurality of named entities;
      calculate a loss value of the classified representative question, a loss value of the classified category, and a loss value of the classified named entity; and
      adjust a weight of a deep learning model used for the multi-tasking learning based on the three calculated loss values.

2. The question-and-answer system of claim 1, wherein the plurality of representative questions stored in the memory includes frequently asked questions (FAQs) related to a vehicle.

3. The question-and-answer system of claim 1, wherein the plurality of named entities includes terms related to a vehicle.

4. The question-and-answer system of claim 1, wherein the learning module includes:
   an encoding module configured to encode an input sequence corresponding to the input data;
   a question classifier configured to classify the representative question based on output of the encoding module;
   a category classifier configured to classify the category based on the output of the encoding module; and
   a named entity classifier configured to classify the named entity based on the output of the encoding module.

5. The question-and-answer system of claim 4, wherein the encoding module includes:
   a first encoding layer configured to perform global encoding on the input sequence; and
   a second encoding layer configured to perform sequential encoding on output of the first encoding layer.

6. The question-and-answer system of claim 5, wherein the learning module further includes a variational inference network that is configured to apply a variational inference on output of the encoding module,
   wherein output of the variational inference network is input to the category classifier.

7. A method of controlling a question-and-answer system, the method comprising:
   storing a plurality of representative questions to match a plurality of answers corresponding respectively to the plurality of representative questions;
   performing multi task learning by using a plurality of extended sentences for the plurality of representative questions as input data, and by using the plurality of representative questions corresponding respectively to the plurality of extended sentences, and a plurality of categories to which the plurality of extended sentences belong, respectively, as output data;
   in response to the multi task learning being completed, determining a representative question corresponding to an input sentence uttered by a user from among the stored plurality of representative questions based on a result of the multi-task learning; and
   determining an answer that matches the determined representative question from among the stored plurality of answers;
   wherein performing the multi task learning includes performing the multi-task learning by using the plurality of extended sentences as input data, and by using the plurality of representative questions, the plurality of categories, and a plurality of named entities included in the plurality of extended sentences, respectively, as output data;
   wherein performing the multi task learning further includes classifying a representative question corresponding to the input data from among the stored plurality of representative questions, a category to which the input data belongs from among the plurality of categories, and a named entity included in the input data from among the plurality of named entities, and
   wherein performing the multi task learning additionally includes calculating a loss value of the classified representative question, a loss value of the classified category, and a loss value of the classified named entity, and adjusting a weight of a deep learning model used for the multi-tasking learning based on the three calculated loss values.

8. The method of claim 7, wherein the stored plurality of representative questions includes frequently asked questions (FAQs) related to a vehicle.

9. The method of claim 7, wherein the plurality of named entities includes terms related to a vehicle.

10. The method of claim 7, wherein performing the multi task learning includes performing global encoding and sequential encoding on an input sequence corresponding to the input data.

* * * * *